US005628050A

United States Patent [19]

McGraw et al.

[11] Patent Number: 5,628,050

[45] Date of Patent: May 6, 1997

[54] DISASTER WARNING COMMUNICATIONS SYSTEM

[75] Inventors: Thomas F. McGraw, Fairfax; Jeffrey A. Mitulla, Burke, both of Va.; Richard S. Woll, Glen Burnie, Md.

[73] Assignee: Scientific and Commercial Systems Corporation, Alexandria, Va.

[21] Appl. No.: 352,595

[22] Filed: Dec. 9, 1994

[51] Int. Cl.[6] .......... H04B 7/185

[52] U.S. Cl. .......... 455/12.1; 455/38.4; 455/67.7

[58] Field of Search .......... 455/12.1, 13.1, 455/38.2, 38.4, 228, 343, 67.7, 158.2, 158.4, 158.5, 186.1, 186.2; 340/825.44, 825.45, 870.1, 870.16, 601

[56] References Cited

U.S. PATENT DOCUMENTS

| | | | |
|---|---|---|---|
| 3,701,024 | 10/1972 | Knowles et al. | 455/228 |
| 4,122,396 | 10/1978 | Grazier et al. | 455/343 |
| 4,152,647 | 5/1979 | Gladden et al. | 455/38.4 |
| 4,155,042 | 5/1979 | Purmut et al. | 326/64 |
| 4,791,572 | 12/1988 | Green, III et al. | 364/449 |
| 4,857,840 | 8/1989 | Lanchais | 324/207 |
| 4,893,247 | 1/1990 | Waudoit | 364/449 |
| 4,914,733 | 4/1990 | Gralnick | 340/961 |
| 4,956,875 | 9/1990 | Bernard et al. | 455/38.2 |
| 4,962,473 | 10/1990 | Crain | 364/900 |
| 5,043,736 | 8/1991 | Darnell | 342/357 |
| 5,132,684 | 7/1992 | Pecker et al. | 340/905 |
| 5,214,757 | 5/1993 | Mauney et al. | 395/161 |
| 5,278,539 | 1/1994 | Lauterbach et al. | 455/13.1 |
| 5,313,200 | 5/1994 | Sone | 340/905 |
| 5,365,447 | 11/1994 | Dennis | 364/449 |
| 5,367,306 | 11/1994 | Hollon et al. | 342/386 |

OTHER PUBLICATIONS

Proceedings, 1987 Carnahan Conference on Security Technology: Electronic Crime Countermeasures, UKY BU143, Jul. 1987.

*Primary Examiner*—Reinhard J. Eisenzopf
*Assistant Examiner*—Marsha D. Banks-Harold
*Attorney, Agent, or Firm*—Collier, Shannon, Rill & Scott, PLLC

[57] ABSTRACT

The Disaster Warning Communications System is a message relay system designed to provide backup warning of impending natural hazard in areas where normal communications are vulnerable to losses imposed by geographic influence. It has been designed to take advantage of the near-hemispheric communications access of existing geostationary weather satellites. This broad coverage allows a single satellite to provide warning to virtually all the inhabited islands in the hemisphere surrounding the subpoint of the satellite, excluding only the extreme polar areas. By extension, three such satellites can cover the entire populated Earth.

21 Claims, 7 Drawing Sheets

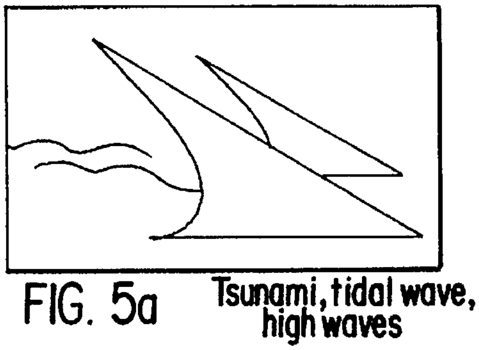
FIG. 5a Tsunami, tidal wave, high waves
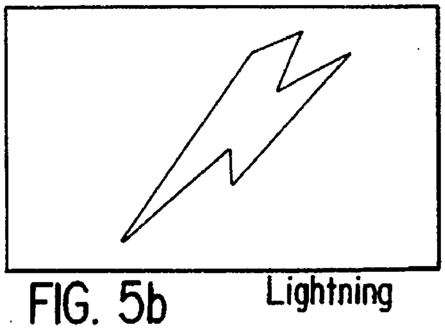
FIG. 5b Lightning
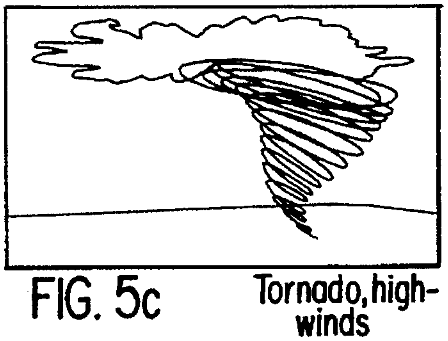
FIG. 5c Tornado, high-winds
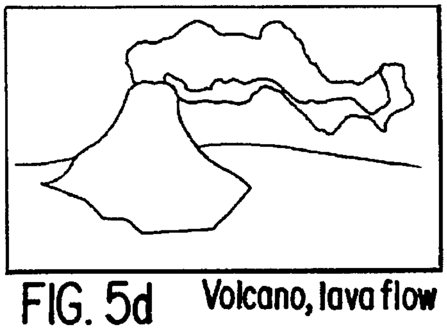
FIG. 5d Volcano, lava flow
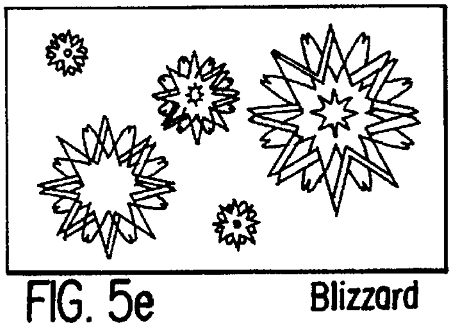
FIG. 5e Blizzard
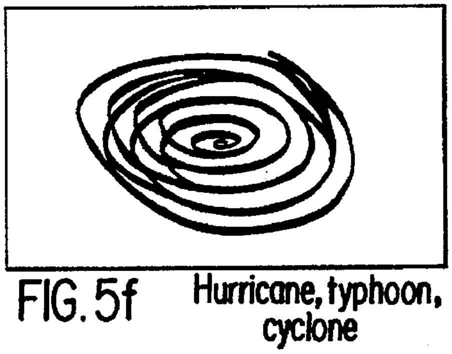
FIG. 5f Hurricane, typhoon, cyclone
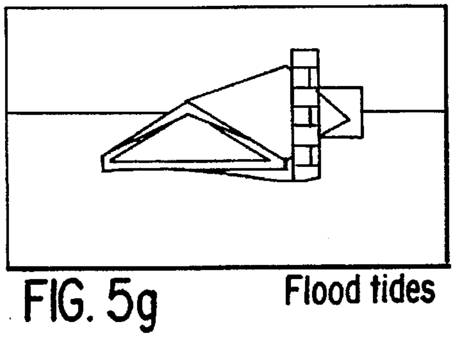
FIG. 5g Flood tides
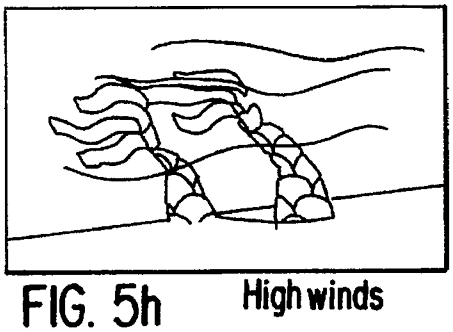
FIG. 5h High winds

DISASTER WARNING COMMUNICATIONS SYSTEM

FIELD OF THE INVENTION

The invention relates to a disaster early warning system. Islands and other isolated population centers are particularly vulnerable to severe weather conditions, and offer the largest communications challenges for warning. Hurricane Iniki in 1993, for example, caused severe damage on the Hawaiian Islands. The threat to human life was aggravated through failure of some of the island telephone systems, delaying dissemination of warnings. The problem is more severe with less developed and less centralized population centers and especially where more than one language is involved. The problem of warning is particularly critical in island and mountain locales, where reliable landline communication systems are not normally available, and distance or intervening geographic features make alternative methods too expensive or technically unachievable.

DESCRIPTION OF THE BACKGROUND ART

U.S. Pat. No. 4,155,042 issued May 15, 1979 to Permut et al. is directed to a disaster alert system. The disclosed system contains two major sub-systems. The first is a central disaster alert station and the second is a plurality of independent and remotely located disaster alert modules. Various output means are provided by which the population may be warned. These include sirens, flashing lights, etc.

U.S. Pat. No. 4,791,572 issued Dec. 13, 1988 to Green III et al. is directed to a method for displaying positional information on map. The invention first digitizes a map by using coordinates of reference monuments. By producing a table of positional data and comparing that data to actual geographical coordinates of references monuments, a determination of relative position of vehicles or vessels may be realized.

U.S. Pat. No. 4,857,840 issued Aug. 15, 1989 to Lanchais is directed to a guidance system. This system provides the user with a handheld device which indicates direction and distance to find a given location. The device functions essentially as a compass or homing device directed toward a specific intended target.

U.S. Pat. No. 4,893,247 issued Jan. 9, 1990 to Waudoit is directed to a device that helps to read a geographical map during the process of a journey covering the area described by the map. The invention uses a swivel upon which the map is mounted. Thus, a user may at all times locate his position on the map.

U.S. Pat. No. 4,962,473 issued Oct. 9, 1990 to Crain is directed to an emergency action system. The emergency action system contains most of the elements of a traditional security system ie., perimeter integrity alarms, video surveilance, central command console and computer networking.

U.S. Pat. No. 5,043,736 issued Aug. 27, 1991 to Darnell et al. is directed to a cellular position locating system. This system contains a portable remote GPS receiver and a transmitter by which to communicate the GPS data to a base station. The system provides for a method for determining the latitude and longitude coordinates of an individual in a remote location using a handheld remote unit and a cellular telephone system.

U.S. Pat. No. 4,132,684 issued Jul. 21, 1992 to Pecker et al. is directed to a traffic information system. The system requires a central monitoring board with an attendant who listens to information from helicopters, spotters, police accident reports and radio stations. The attendant then loads the information which is then transmitted to individual user monitors.

U.S. Pat. No. 5,214,757 issued May 25, 1993 to Mauney et al. is directed to an interactive automated mapping system. The system uses GPS data to create or update a geographic information base. The invention seeks to provide a real time display of a user's travel across an existing map.

U.S. Pat. No. 5,313,200 issued May 17, 1994 to Sone is directed to a road traffic congestion display system. This system is designed to be mounted in a vehicle and display a road map image which contains a set of directional arrows indicating traffic congestion at or near the vehicle.

U.S. Pat. No. 4,365,447 issued Nov. 15, 1994 to Dennis is directed to a GPS and satellite navigation system. This system is designed to increase the accuracy of data provided by GPS alone. The user receives data from both GPS and geostationary satellites which are calibrated and processed to obtain more accurate positional coordinates.

U.S. Pat. No. 5,367,306 issued Nov. 22, 1994 to Hollon et al. is directed to a GPS integrated emergency located transmitter (ELT) system. The system integrates the various electronic positioning systems to provide accurate information for an emergency transmitter. The system to designed to solve the prior art problem of loss of time in establishing the location of a beacon signal.

The 1987 paper on Electronic Crime Counter Measures from the Carnahan Conference on Security Technology is directed to a security console system. It is comprised of monitor, work stations, alarms and communication devices. It also contains a map display to be shown on console CRT color coded to indicate problem areas.

OBJECTS OF THE INVENTION

There exists then a need for an early warning system which overcomes the deficiencies in current impending disaster alert technology.

It is an object of the invention to provide a disaster warning system in which each user has a personal receiver by which to recieve information.

It is another object of the invention to provide a disaster warning system which communicates specific information to the endangered persons such as, the type of emergency, the direction in which the emergency is moving and its severity.

It is yet another object of the invention to provide a light weight, portable, personal receiver which a user may keep with him at all times, so as never to be incommunicado with respect to the disaster alert system.

It is a further object of the invention to provide a disaster alert system which uses universal symbols and intuitive displays to communicate a variety of information while elminating the danger of non-receipt of information due to language barriers.

It is a yet further object of the invention to provide a disaster alert system which uses a satellite to convey warning information to a series of local authorities and repeater field systems on a rapid basis.

It is still another object of the invention to provide a terrestrial based system to be used in a limited area such as a campground, a factory, or an island.

It is another object of the invention to provide a method of communication of disaster warning information to select group of individuals which may be unreachable by traditional communication means.

SUMMARY OF THE INVENTION

Many islands or secluded places are too rugged or unimproved to support land-line communications. As is often the case, people are isolated from timely warning of impending disasters. This may be by design, e.g. when camping or rock climbing, or necessity where people may not possess radio or television receivers. Additionally, in many areas the people are too dispersed for sirens or other traditional centralized warning devices to be effective. Currently warnings get to isolated segments of the population either too late or not at all.

Domestic approaches such as CONELRAD or television warnings require, in addition to possessing them in the first place, constant attention to those media. Local television and radio warnings are also susceptible to power outages, a real concern when the impending disaster is a weather condition. These approaches are also deficient in that individuals who are away from home, are not adequately warned. In many cases, they are most in need of early warning.

The Disaster Warning System is designed to overcome language and education variations through use of graphic message displays on personal receivers. The use of available capacity on a constellation of three or more geostationary earth satellites gives direct access to most of the Earth's population. Provision of special receivers to the affected isolated populace permits officials and civilians direct access to the warning information. In summary, this invention permits wide dissemination of simple (one-way) disaster warning messages to isolated populations, to support early evacuation or other survival actions in the face of hurricanes, tidal waves, or other forcastable threats. The present invention addresses the problems encountered in the present state of the art and as set forth in detail hereinafter by providing a means for collectively alerting the populace of remote and/or isolated territory to imminent danger.

BRIEF DESCRIPTION OF THE DRAWINGS

FIG. 5 is a pictorial representation of icons of the system of the present invention.

DETAILED DESCRIPTION OF THE INVENTION

The characteristics and features of the present invention will be better understood by reference to the following detailed description and accompanying drawings. It is to be understood that both the foregoing general description and the following detailed description are exemplary and explanatory only, and are not intended to restrict the invention thereto. The accompanying drawings which constitute part of the specification, illustrate certain embodiments of the invention, and together with the detailed description, serve to explain the principles of the present invention.

As illustrated in the accompanying drawings, one embodiment of the invention is: a radio-frequency (RF) system to provide direct warning of danger to remote or isolated individuals or population centers, comprising a satellite uplink means adapted for communicating with a satellite; a satellite for broadcasting a warning transmission; a downlink receiver means for receiving signals and displaying the warning messages for use of emergency service personnel; a repeater terminal means for receiving the satellite warning transmissions and converting them for rebroadcast at VHF frequencies, over a terrestrial path to individual users; a personal receiver means for providing audio and/or visual information; an audio annunciator for alerting the user to said warning message; and a visual display means or communication in spite of differences in literacy or spoken language, or dialect, among the isolated populations targeted by this system.

Figure 1:
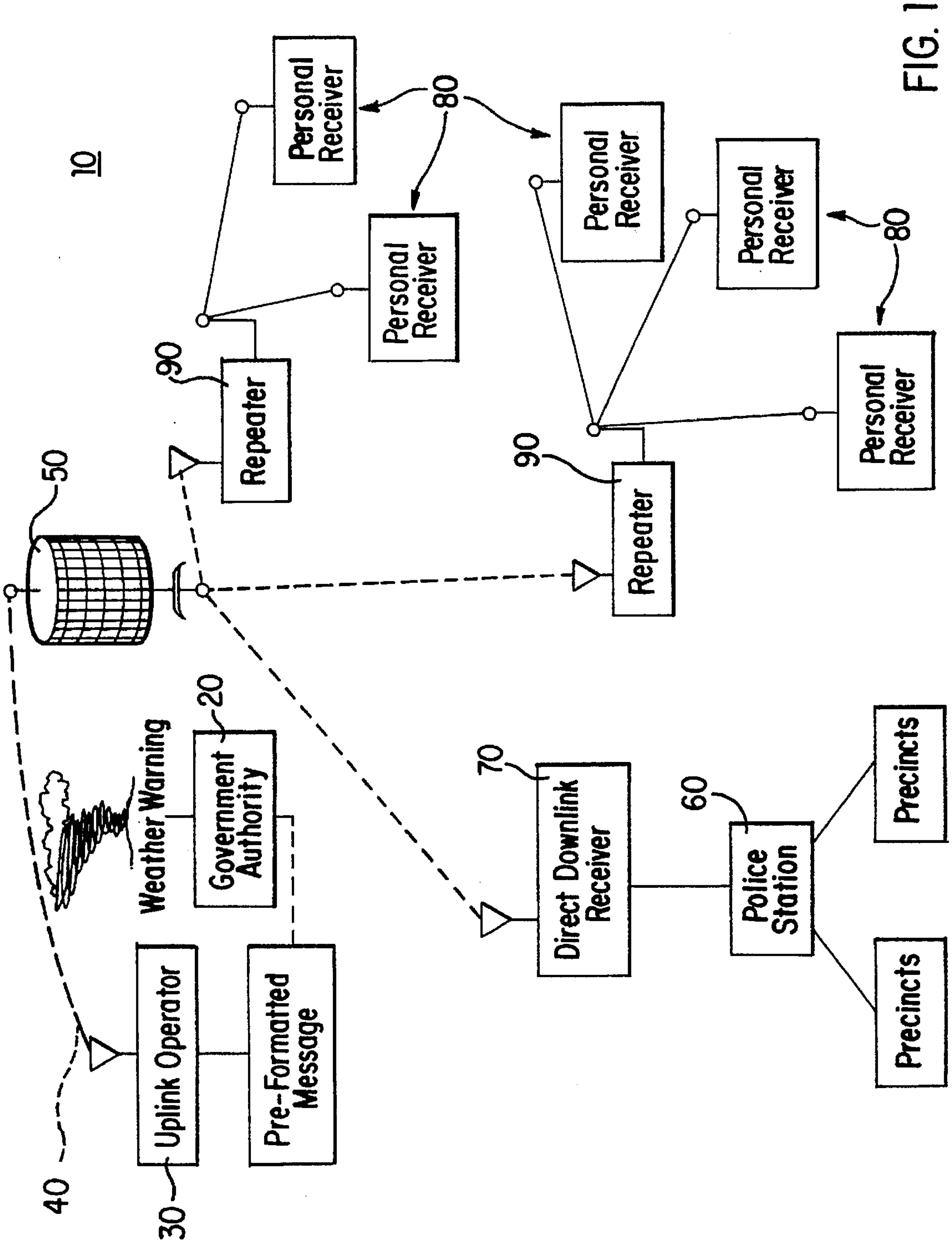
FIG. 1 is a graphic representation of the elements of the Disaster Warning Communications System, of the present invention.

FIG. 1 illustrates the elements of the disaster warning communications system 10 of one embodiment of the present invention. When the governmental agency 20 is notified, by whatever means, that a disaster threatens some or all of its jurisdiction, it requests that the designated satellite uplink 30 operator transmit a predetermined message sequence 40 to the geostationary satellite 50 in view of the threatened area. While any satellite with a downlink channel may be utilized, applicants contemplate that weather satellites will be used. Weather satellites are preferred because they are already in orbit, their image downlinks may be used without modification, and their coverage is essentially universal.

The message preferably contains detailed information to be disseminated to the endangered population. For example, the message could indicate that a tornado is approaching. The satellite 50 rebroadcasts the message at a representative frequency, in a broad pattern covering the threatened area. Police stations and other emergency service centers 60 are equipped with direct downlink receivers 70, which directly convert the message to a visual display on a personal receiver 80 indicating the nature of the warning. Preferably, rebroadcast is required and the police or other emergency personnel employ all means at their disposal to warn the populace.

In many areas, however, the authorities may have no facilities in close proximity to the citizens. In those cases, a repeater system 90 is used to receive the satellite signal, convert it to an appropriate frequency and rebroadcast it terrestrially. These broadcasts are meant to notify the people, via personal receivers 80, which may be worn on the body, and thus always be ready to pass the alert. The personal receivers 80 respond to the repeated transmission with an audio annunciator 100 to draw the wearer's attention. Once alerted, the wearer observes the visual display to determine the nature of the emergency. Preferably, the system includes a display channel to indicate a periodic test 120 to ensure that the system is ready.

Figure 2:
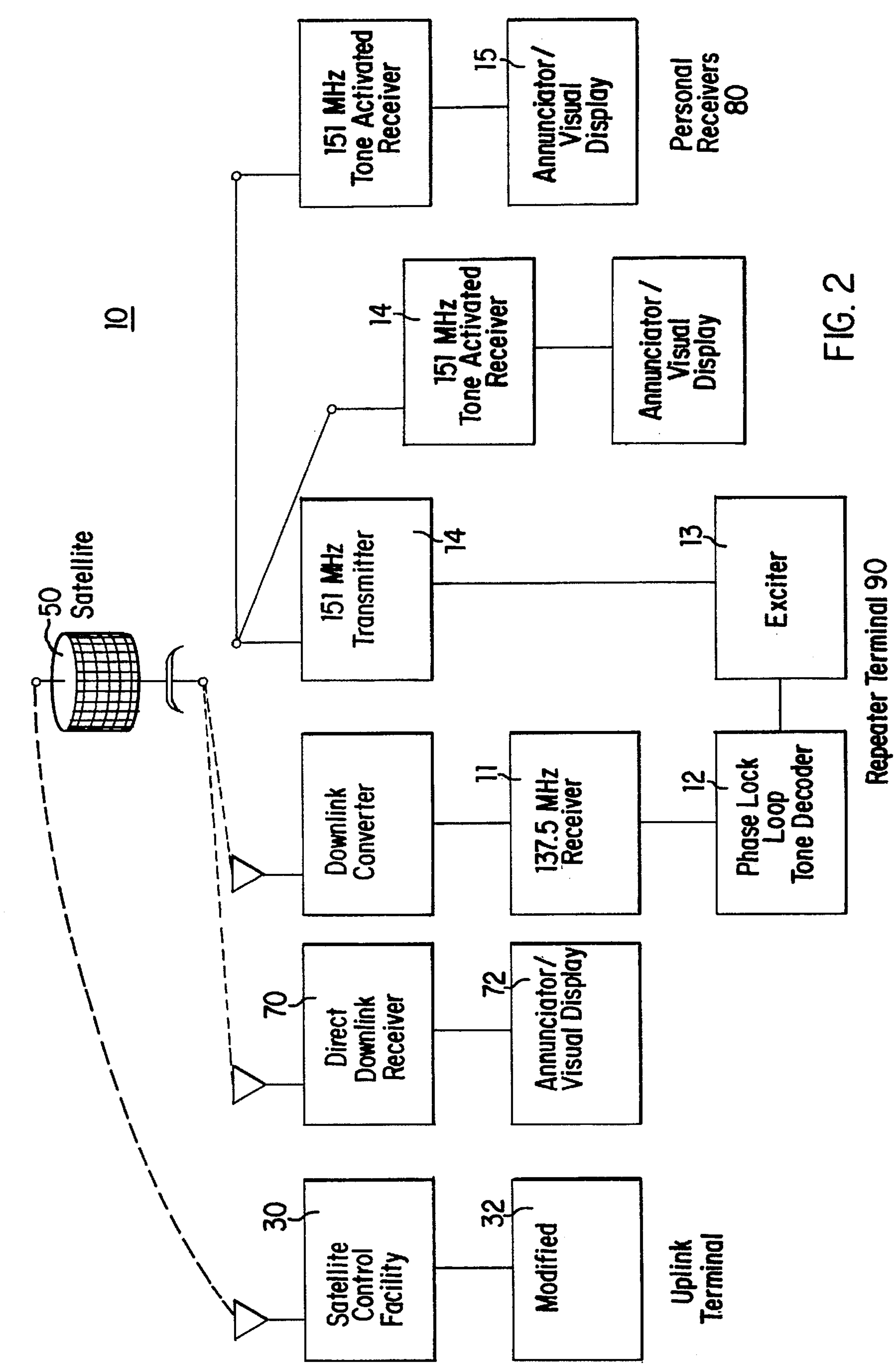
FIG. 2 is a simplified block diagram of an embodiment of the system of FIG. 1.

FIG. 2 explains the system in general terms, via block diagram. At the uplink terminal, or satellite control facility 30, a modified Dual Tone Multiple Frequency (DTMF) encoder (keypad) 32 is used to enter the message on an analog transmission channel to the satellite 50. DTMF codes produce the tones in all touch tone telephones today. Thus the invention uses standard off-the-shelf equipment. The use frequencies may be shifted periodically in order to minimize interference and tampering. Certainly, digital technology is well within the scope of the instant invention. We have chosen to express the exemplary embodiments in terms of analog technology since that is what is currently in place and one object of this invention is to provide a system an minimal cost and maximum coverage.

The encoder 32 is preferably a modified standard telephone keypad. The modification is a slight shift in the resultant tone frequencies to eliminate the possibility of unauthorized messages via standard keypads. The direct downlink receiver 70 is the same receiver as that used in the downlink converter, but established to operate independently in those environments where the local authorities must be notified, rather than the general populace. It is contemplated that the information transmitted by the satellite will be received by two types of receivers. The first is local authorities such as police or emergency management authority. These groups will then attempt notify the local populace in traditional methods. The second is the independent repeater terminals. They will recieve, convert and re-transmit the disaster warning directly to the individual users.

The receiver 70 is equipped with a display capability 72 related to that provided to the personal receiver. It hears and responds to the same codes as the repeater system. The DTMF tones are identical, regardless of frequency or direct/relay transmission technique. The repeater terminal 90 includes a downlink converter, comprised of a low-noise amplifier and a downconverter, which will then transmit a signal at an appropriate frequency such as 137.5 MHz. The VHF signal is accepted by the receiver 11, and passed through a phase-lock loop detector 12, serving as a tone decoder. The decoded tones are passed to the 151 MHz transmitter 14, which is powered by the exciter 13. The 151 MHz signal is sent by the repeater 90 over a wide radius, to be received by the personal receivers 80 issued to individual citizens. The personal receivers 80 comprise a 151 MHz tone-activated receiver, and an audio annunciator/visual display subsystem 15. The audio annunciator is an audible tone that calls the wearer's attention to the warning, and the visual display indicates the nature of the threat.

Figure 3:
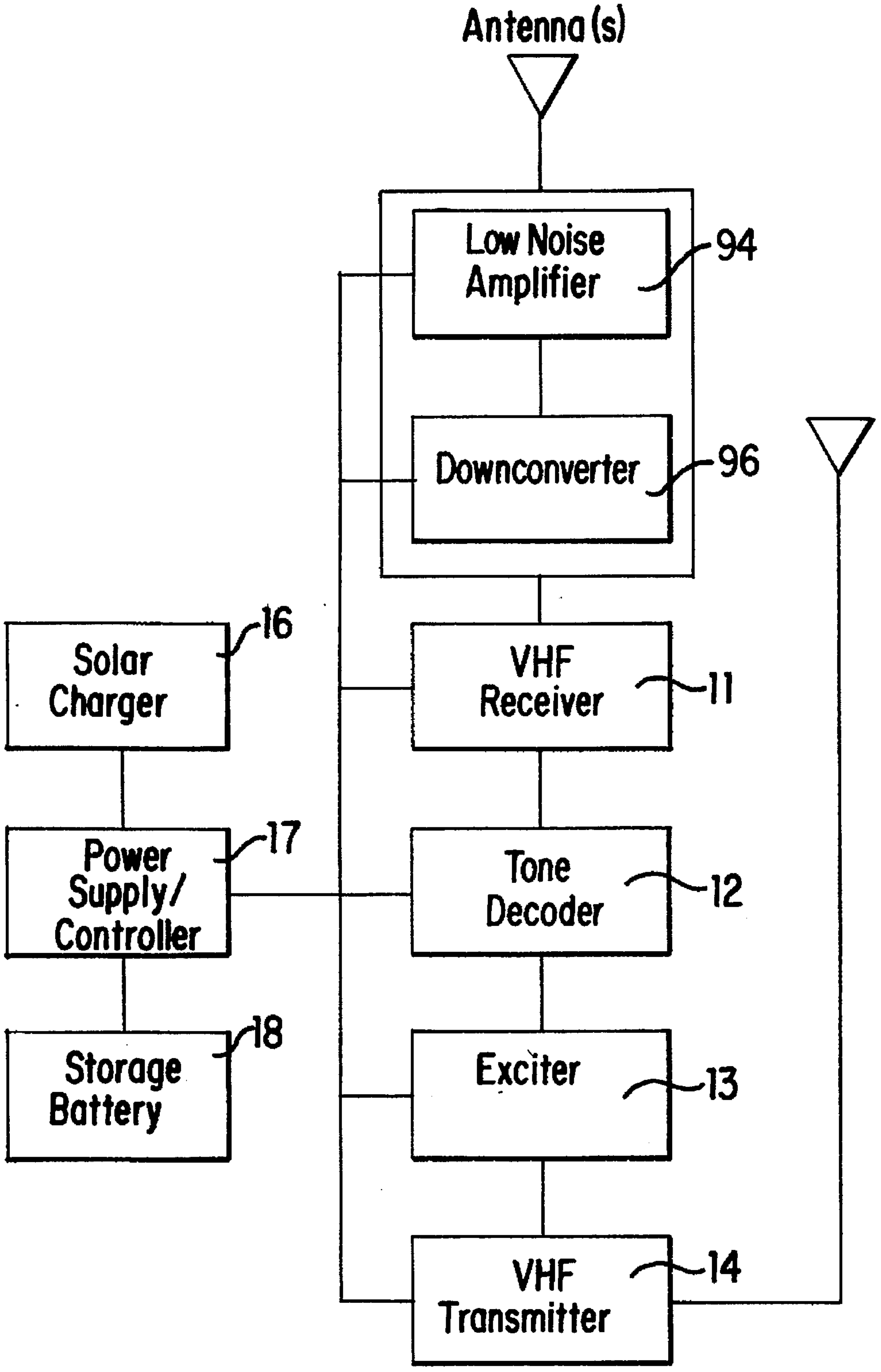
FIG. 3 is a block diagram of a repeater subsystem segment of the system of FIGS. 1 and 2.

FIG. 3 expands on the explanation of the repeater subsystem 90. The downlinked signal is picked up by the 1691 MHz antenna and passed to the downlink converter 92, which consists of a low-noise amplifier 94 capable of operating at 1691 MHz, and a downconverter 96, which accepts the amplified 1691 MHz signal, and converts it to 137.5 MHz, which can be accepted by the internal receiver 11. The tone decoder 12 processes the receiver output to extract the codes and prepare them for rebroadcast at 151 MHz (VHF), via the exciter 14 and the transmitter 14. All elements of the repeater station are powered by a storage battery 18, which is float-charged by a solar panel charger 16, and managed by the power supply/controller 17. The float-charge allows for a prescribed voltage level to be maintained despite varying drains on the battery. The solar panel charger is a desirable subsystem in that the operation will not be impaired by interruption of the local power grid (as is often the case in severe weather situations).

Figure 4:
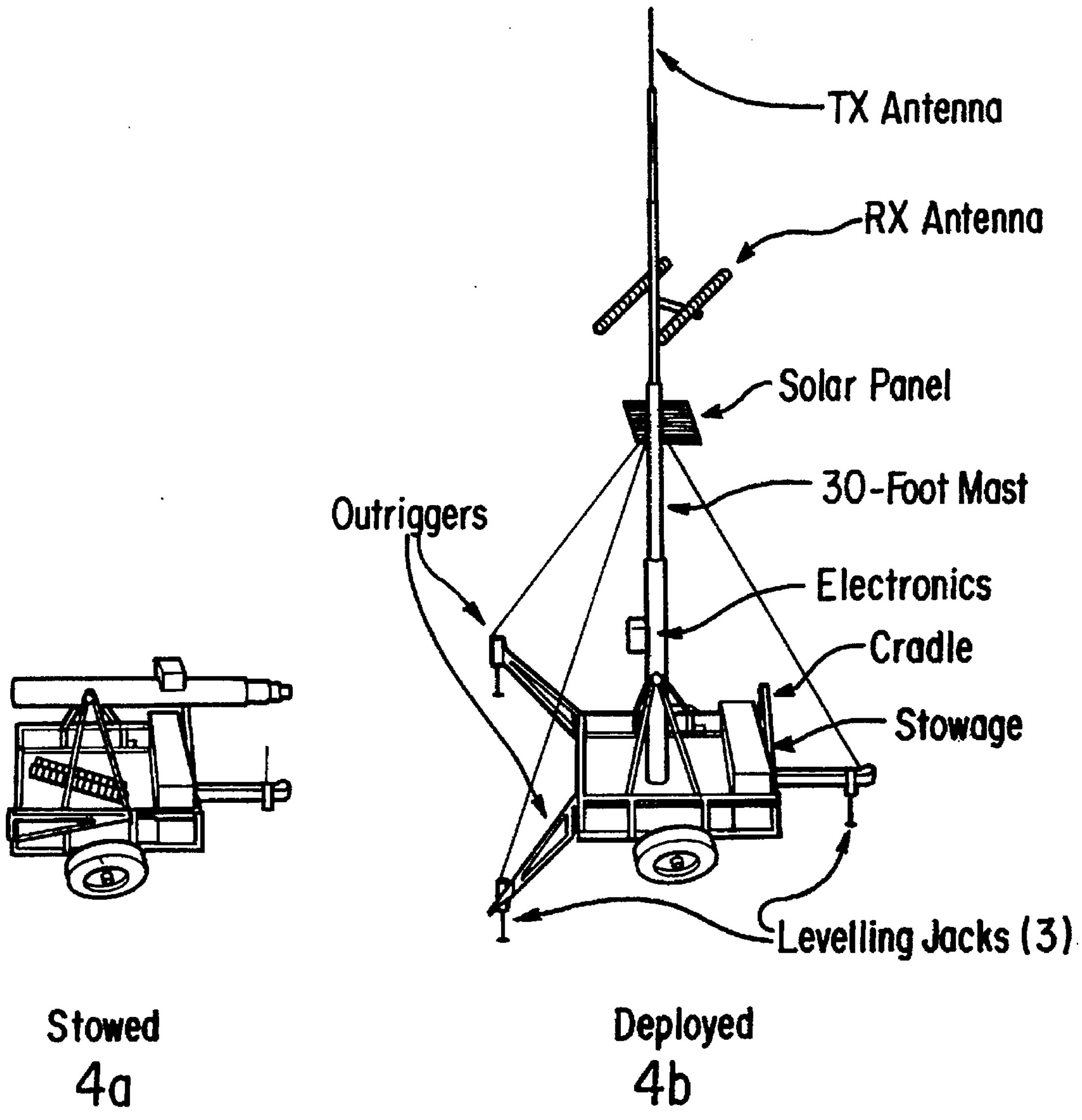
FIG. 4 is an oblique view of an embodiment of the repeater of the present invention.

FIG. 4 illustrates one physical configuration which might be employed in the system. A portable repeater 90 which might be used for site surveys to select the best location for a permanent unit, or might be used as a fill-in during failure of a permanent system. This figure simply illustrates the general appearance of the receive and transmit antennas, the solar panel charger, and the relatively small electronics package.

FIG. 5 illustrates representative visual (icon) displays of the type which might be used in selected areas to communicate danger from specific threats. These may be in the form of backlit transparencies or artwork with a designation device such as an LED to indicate which one is appropriate. They would be chosen to match popular images of the various threat conditions, and to render irrelevant language or dialect variations within the threat area. Actual images will be selected on the basis of local cultures and their images of the threats, and may be easily changed to match changing threats.

Figure 6:
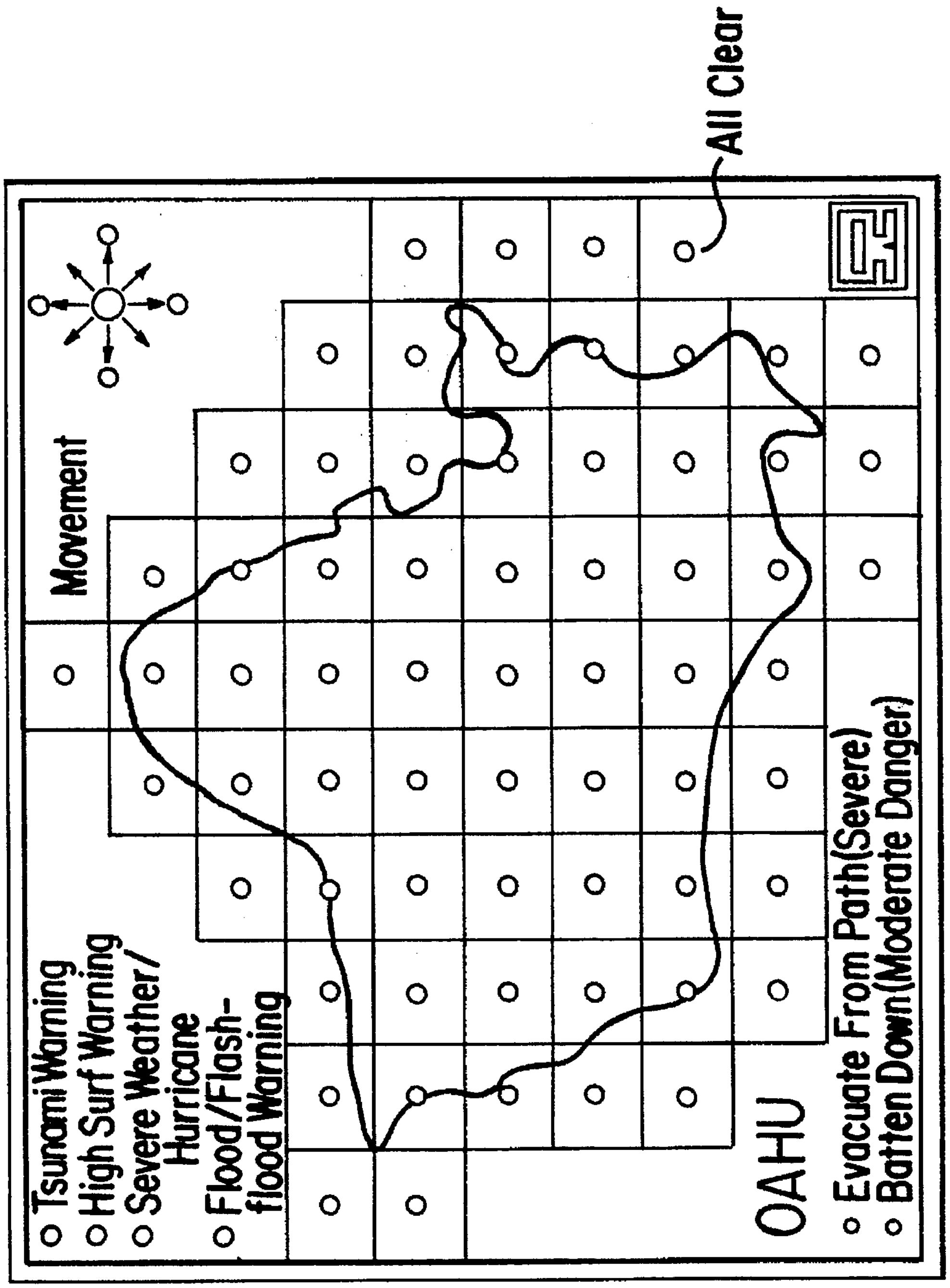
FIG. 6 is a sample of the display face of the portable receiver of one embodiment of the invention.

FIG. 6 illustrates one version of a display contemplated by the present invention. In this version users would learn, the type of disaster, its location, its direction, what to do, and when the danger has passed.

Figure 7:
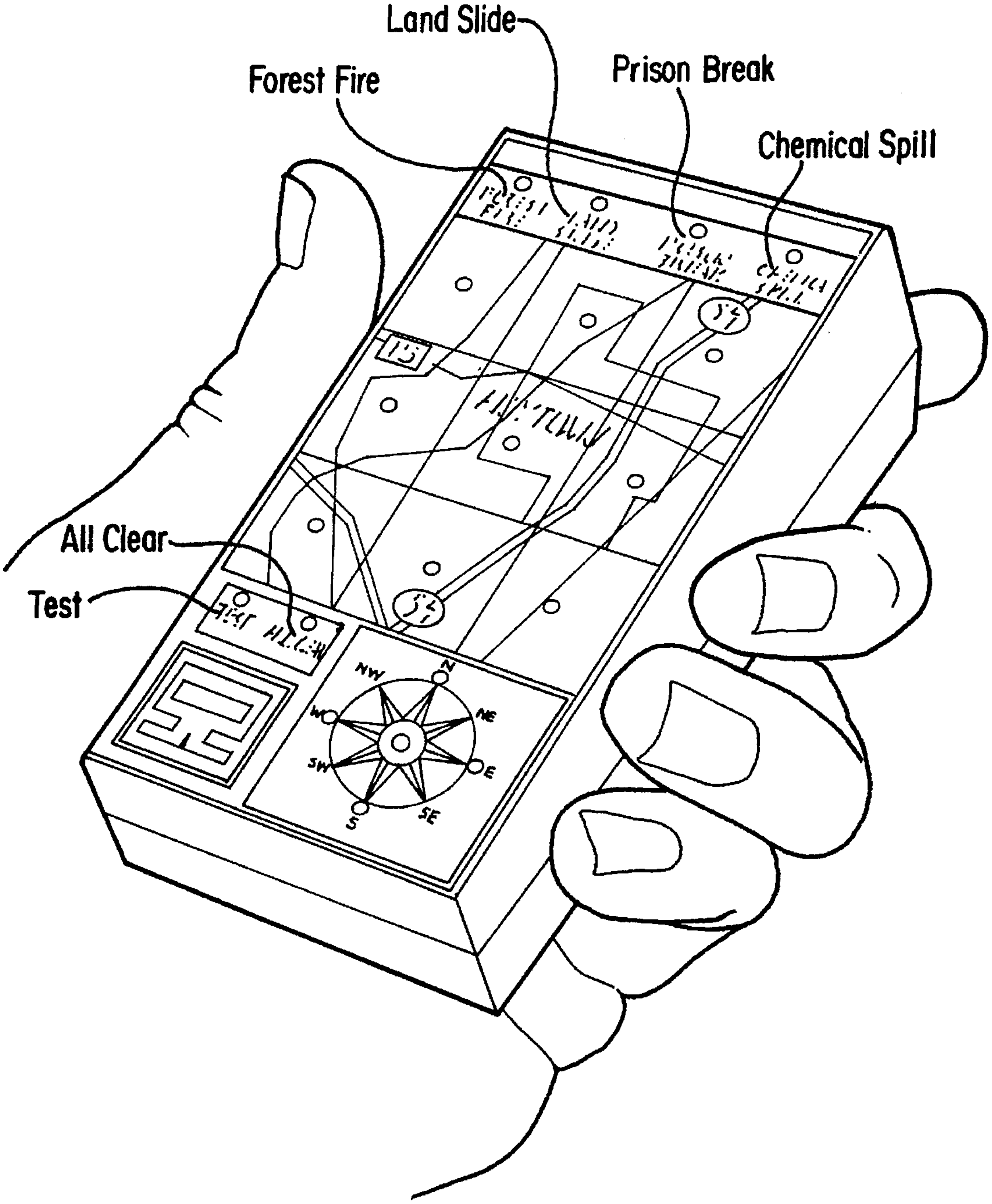
FIG. 7 is an oblique view of one version of the personal receiver of the present invention.

FIG. 7 illustrates one version of a representative personal receiver. Four sample crises (forest fire, landslide, prison break, chemical spill) are indicated by individual LEDs. The map contains with nine segments which can be separately illuminated to indicate the location of the problem with particularity. This, in combination with a "compass rose " to illustrate up to eight discrete directions of movement allow the user to follow the motion of the disaster and plan accordingly. Never before has such a plethora of information been available to affected people in such a short period of time or at an infinite number of remote locations. Finally, there exists a test/all clear portion of the display.

Functionally, the system consists of a message input device, a satellite uplink terminal, the satellite, a specialized repeater station, including a downlink receiver, transmitter, an unlimited number of personal receivers, and a limited number of direct downlink receivers. In a preferred embodiment of the invention, the system includes a keypad and Dual Tone Multiple Frequency (DTMF) encoder, which is located at the weather satellite uplink ground station. When the governing authority determines that a natural threat such as a hurricane or tidal wave is approaching its jurisdiction, it can implement a request to the operator of the uplink station. The request would normally be for a specific, brief uplink transmission, via an existing 2400 Hz channel. The request would be carried out as a predetermined sequence of keystrokes on the uplink keypad. Each alternative transmission represents a particular preformatted warning message keyed to the nature of the hazard to be encountered. The keypad creates a word composed of DTMF tones, which are transmitted to the satellite, which rebroadcasts them to a large "footprint " on the surface of the Earth.

Three such satellites, spaced in an equilateral triangle through the equator, can reach virtually all the populated areas of the Earth, excluding only the Polar areas above 80 degrees of latitude or so. The transmission, rebroadcast by the satellite, is received by two different elements of the present invention. One of those elements is a direct downlink receiver. That device is capable of receiving the signal directly, with no additional step. It is designed for base station operation at a police station or other crisis management site.

The second receiver is part of a solar-powered repeater device, mounted in such a way that its retransmission reaches a large terrestrial radius. The repeater retransmits in the very high frequency (VHF) band, to take advantage of the VHF accommodation of the Earth's curvature and large masking features. The repeater's VHF signal is received by personal receivers distributed to the general public in threatened areas. The repeater transmitter and the personal receivers comprise the "terrestrial segment" of the system. The terrestrial segment may be operated without the downlink receiver for purely local hazard warning. The personal receivers are designed for belt-mounting, and are small, lightweight, battery-powered units. The direct downlink receivers and the personal receivers are equipped with audio annunciators to draw the user's attention, and visual icons to indicate the nature of the threat. The maps are selected for local values, and the icons are selected on a geographic basis, to best communicate with the populace. Both language and level of literacy are considered in these designs. The entire system contains the means for periodic test, to ensure its constant readiness.

The system of the instant invention has been described in terms of its application as a broad based, public safety apparatus. This invention may be adapted equally as well to much smaller situation. These local uses include warnings for neighborhoods surrounding prisons or chemical manufacturing facilities. Additionally, systems could be installed in national parks to warn campers of potential hazards. This is feasible since the electronics involved in customization do not vary. A mere change in the display icons, and the system may be tailored to just about any needs.

We claim:

1. An early warning personal communication system comprising:

an uplink means which communicates with a satellite;

a satellite;

a plurality of downlink means which are capable of receiving communications from said satellite; and a plurality of receivers, wherein said receivers comprise a portable unit with a visual display subsystem.

2. The early warning personal communication system of claim 1 where said uplink means communicates directly with the satellite in order to forward a message of disaster warning to be disseminated to the public.

3. The early warning personal communication system of claim 1 where said satellite is a geo-stationary satellite.

4. The early warning personal communication system of claim 1 where said satellite is a government owned/operated satellite.

5. The early warning personal communication system of claim 1 where the plurality of downlink means comprise at least one first downlink means referred to as a direct downlink receiver, said direct downlink receiver being located at or in direct communication with local emergency management authorities, and a plurality of second downlink means referred to as repeater terminals.

6. The early warning personal communication system of claim 5 where said second downlink means is comprised of a downlink converter, a decoder, and exciter and a transmitter.

7. The early warning personal communication system of claim 1 where said receivers comprise a light-weight, portable unit with a visual display subsystem.

8. The early warning personal communication system of claim 7 where said visual display subsystem is designed to convey information of at least the type of disaster, its location, and its direction of movement.

9. The early warning personal communication system of claim 7 where said visual display subsystem additionally comprises an audio annunciator and a test/all clear display.

10. An early warning personal communication system comprising:

an uplink means which communicates with a satellite;

a geo-stationary satellite;

downlink means comprised of at least one first downlink means and a plurality of second downlink means each of which is capable of receiving communications from said satellite; and a plurality of personal receivers, wherein said receivers comprise a portable unit with a visual display subsystem which conveys specific information to its user comprising the type of disaster, and its position relative to the user through the use of icons and LEDs.

11. The early warning personal communication system of claim 10 where the uplink means communicates directly with the satellite in order to forward a message of disaster warning to be disseminated to the public.

12. The early warning personal communication system of claim 10 where said satellite is a government owned/operated satellite.

13. The early warning personal communication system of claim 10 wherein said at least one first downlink means referred to as a direct downlink receiver, said direct downlink receiver being located at or in direct communication with local emergency management authorities, and a plurality of second downlink means referred to as a repeater terminal.

14. The early warning personal communication system of claim 13 where said second downlink means is comprised of a downlink converter, a decoder, and exciter and a transmitter.

15. The early warning personal communication system of claim 13 where said repeater terminal is comprised of:

a direct downlink converter which comprises a low-noise amplifier and a downconverter;

a receiver;

a phase-lock loop detector;

an exciter; and a transmitter.

16. The early warning personal communication system of claim 15 which further comprises a storage battery which is float-charged by a solar panel charger.

17. The early warning personal communication system of claim 10 where said receivers comprise a light-weight, portable unit with a visual display subsystem.

18. The early warning personal communication system of claim 10 where said visual display subsystem is designed to convey information of at least the type of disaster, its location, and the direction of movement.

19. The early warning personal communication system of claim 10 where said visual display subsystem additionally comprises an audio annunciator and a test/all clear display.

20. An early warning personal communication system comprising:

an uplink means which communicates with a satellite in order to forward a message of disaster warning to be disseminated to the public, said satellite being operated by a satellite control facility;

a geo-stationary, government owned/operated satellite;

downlink means comprised of at least one first downlink means, said first downlink means being referred to as a direct downlink receiver and being located at or in direct communication with local emergency management authorities, and a plurality of second downlink means referred to as a repeater terminal each of which capable of receiving communications from said satellite wherein said second downlink means is comprised of a downlink converter, a decoder, and exciter and a transmitter; and a plurality of personal receivers comprising a light-weight, portable unit with a visual display subsystem designed to convey information of at least the type of disaster, and its position relative to the user.

21. The early warning personal communication system of claim 20 where said visual display subsystem additionally comprises an audio annunciator and a test/all clear display.

* * * * *